US006538262B1

(12) United States Patent
Crespi et al.

(10) Patent No.: US 6,538,262 B1
(45) Date of Patent: *Mar. 25, 2003

(54) NANOTUBE JUNCTIONS

(75) Inventors: Vincent Henry Crespi, Darien, IL (US); Marvin Lou Cohen, Berkeley, CA (US); Steven Gwon Sheng Louie, Berkeley, CA (US); Alexander Karlwalter Zettl, Kensington, CA (US)

(73) Assignee: The Regents of the University of California, Oakland, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,461

(22) Filed: Jan. 31, 1997

Related U.S. Application Data

(60) Provisional application No. 60/011,065, filed on Feb. 2, 1996.

(51) Int. Cl.[7] .................................................. D01F 9/12
(52) U.S. Cl. ........................................ 257/40; 428/408
(58) Field of Search ............................... 257/613, 798, 257/40; 428/408, 367, 99

(56) References Cited

U.S. PATENT DOCUMENTS

| | | | | |
|---|---|---|---|---|
| 5,300,203 A | * | 4/1994 | Smalley | 204/157.41 |
| 5,348,936 A | * | 9/1994 | McCauley et al. | 505/460 |
| 5,395,496 A | * | 3/1995 | Tsantrizos et al. | 204/173 |
| 5,489,477 A | * | 2/1996 | Ohta et al. | 428/408 |
| 5,591,312 A | * | 1/1997 | Smalley | 204/157.41 |
| 5,744,399 A | * | 4/1998 | Rostoker et al. | 438/622 |
| 5,993,697 A | * | 11/1999 | Cohen et al. | 252/502 |

OTHER PUBLICATIONS

Saito et al.—Physical Review, "Tunneling Conductance of Connected Carbon Nanotube", Jan. 15, 1996.*
Ebbesen et al.—"Topological and SP3 Defect Structures in Nanotube", Feb. 10, 1995.*
Dunlap—Physical Review, "Relating Carbon Tubles", Feb. 15, 1994.*
Johnson, "Electronics of Single–Wall Carbon Nanotubes," Technical Digest Papers, 1999 IEEE International Solid–State Circuits Conference, pp. 210–211.*
Yi, et al., "Atomic Structure and Doping of Microtubules," Physical Review B, vol. 47, No. 3, pp. 1708–1711.*

(List continued on next page.)

Primary Examiner—Long Pham
Assistant Examiner—Wai-Sing Louie
(74) Attorney, Agent, or Firm—Henry P. Sartorio (57) ABSTRACT

The present invention comprises a new nanoscale metal-semiconductor, semiconductor-semiconductor, or metal-metal junction, designed by introducing topological or chemical defects in the atomic structure of the nanotube. Nanotubes comprising adjacent sections having differing electrical properties are described. These nanotubes can be constructed from combinations of carbon, boron, nitrogen and other elements. The nanotube can be designed having different indices on either side of a junction point in a continuous tube so that the electrical properties on either side of the junction vary in a useful fashion. For example, the inventive nanotube may be electrically conducting on one side of a junction and semiconducting on the other side. An example of a semiconductor-metal junction is a Schottky barrier. Alternatively, the nanotube may exhibit different semiconductor properties on either side of the junction. Nanotubes containing heterojunctions, Schottky barriers, and metal-metal junctions are useful for microcircuitry.

9 Claims, 6 Drawing Sheets

OTHER PUBLICATIONS

Iijima, et al., "Pentagons, Heptagons and Negativbe Curvature in Graphite Microtubule Growth," Nature, vol. 356, No. 6372, Apr. 1992, pp. 776–778.*

Iijima, et al., "Single Shell Carbon Nanotubes of 1–nm Diameter," Nature, vol. 363, Jun. 1993, pp. 603–605.*

Saito, et al., "Tunneling Conductance of Connected Carbon Nanotubes," Phys. Rev. B, vol. 53, No. 4, Jan. 1996, pp. 2044–2050.*

Dresselhaus, et al., "Science of Fullerenes and Carbon Nanotubes," Feb. 1996, pp. 756–917.*

Dunlap, "Contraints on Small Graphitic Helices," Phys. Rev. B, vol. 50, No. 11, Sep. 1994, pp. 8134–8137.*

Dunlap, "Relating Carbon Tubules," Phys. Rev. B, vol. 49, No. 8, Feb. 1994, pp. 5643–5650.*

Ebbesen, et al., "Topological and SP3 Defect Structures in Nanotubes," Carbon, vol. 33, No. 7, 1995, pp. 973–978.*

Iijima, "Helical Microtubes of Graphitic Carbon," Nature, vol. 543, Nov. 1991, pp. 56–58.*

* cited by examiner

NANOTUBE JUNCTIONS

This invention is disclosed in provisional application serial No. 60/011065 and this application claims benefit of the provisional filing date, Feb. 2, 1996.

This invention was made with U.S. Government support under Contract No. DE-AC03-76SF00098 between the U.S. Department of Energy and the University of California for the operation of Lawrence Berkeley Laboratory. The U.S. Government may have certain rights in this invention.

I. BACKGROUND OF THE INVENTION

1. Field of the Invention

This invention relates generally to microelectronics and more specifically to metal-semiconductor, metal-metal, and semiconductor-semiconductor junctions in nanotubes.

2. Description of Related Art

The electronic structure of carbon nanotubes is governed in part by the geometrical structure of the tube (R. Saito et al., Appl Phys Lett, 60:2204, 1992; and N. Hamada et al., Phys Rev Lett. 68:1579, 1992).

A nanotube index (n,m) has been developed to describe the nanotube structure. It is described in detail by C. T. White et al. "Predicting Properties of Fullerenes and their Derivatives", Chapter 6, page 159 and following, in *Buckminsterfullerenes*, W. E. Billups, and M. A. Ciufolini, ed. (NY: VCH Publishers, 1993). Carbon nanotubes can be understood by thinking of them as a graphite sheet, in which the carbon atoms are arranged in a honeycomb lattice of hexagonal rings. The sheet is rolled up and spliced together to form a tube. That is, the tube is a conformal mapping of the two dimensional sheet onto the surface of a cylinder. The two-dimensional lattice sheet can be rolled many different ways to form a tube. The nanotube index describes how a sheet is rolled into the tube. A special circumference vector is related to the number of adjacent hexagonal carbon rings that are traversed when tracing the tube circumference once, and the amount the lattice is skewed when it is rolled. The lattice vector, R, is made up of two component vectors, $R_1$ and $R_2$, where $R=nR_1+mR_2$ with n and m integers or zero.

Electrical properties of nanotubes are associated with the nanotube index as follows:

1. Carbon nanotubes having a nanotube index in which n=m, for example, (5,5) or (9,9), are metals. These nanotubes conduct electrical current.
2. Carbon nanotubes, characterized by an index of (n,m) where n−m is a nonzero multiple of three, for example, (6,3) or (12,0). These nanotubes have a band-gap that is typically less than 0.1 eV, characteristic of semiconductors or semimetals. The size of the band-gap is inversely proportional to the tube radii. However, if the radius is very small as described by X. Blase et al., Phys Rev. Lett. 72: 1878, 1994, in which case, the large curvature further modifies the nanotube electrical properties.
3. Carbon nanotubes having nanotube indices different from those described above, for example, (7,0) or (13,4), are semiconductors that have a band-gap size up to approximately 1 eV. The size of the band-gap is inversely proportional to the tube radius (J. W. Mintmire et al., Mater. Res. Soc. Sym. Proc. 247:339, 1992).

Typically, a useful junction of two semiconductors requires that the two semiconductors have band-gaps whose difference exceeds the electron thermal energy.

T. W. Ebbesen and T. Takada (Carbon, 33: 973, 1995) have noted that the index of a tube can be changed by introducing topological defects into the hexagonal bond network of carbon. Theoretically nanotubes can be constructed to have a particular index and exhibit particular electrical properties. To result in a useful structure, the defects may not induce a net curvature which might cause the tube either to flare or to close, and minimal local curvature surrounding the induced defect is desirable to minimize any defect energy. Since defects can change the index in a nanotube, they are considered to be the cause of some flaring or closing of the tube structure as a result of the introduced defect in the hexagonal carbon lattice.

While some researchers have described nanotubes having any of a single pair of indices, (n,m), no-one has described how a continuous tube could be formed having separate sections that would be characterized by different indices, $(n_1,m_1)$ and $(n_2,m_2)$.

No-one has discovered a means to change the nanotube index within a continuous carbon nanotube without causing the net curvature to change so that one end closes or flares. Another way to say this is that no one has found a way to join two carbon nanotubes having different nanotube indices to form a continuous tube.

It would be highly desirable and useful to alter the index within a continuous tube in a manner that does not change the net curvature of the tube but does alter the nanotube's electrical properties on either side of specific point so that adjoining sections of the nanotube are semiconducting, non-conducting, or conducting as needed for semiconductor devices and circuits. Another way of stating this is that it would be very useful to be able to join two nanotubes having different indices through a junction.

II. SUMMARY OF THE INVENTION

It is an object of the invention to design carbon nanotubes containing adjacent sections of differing electrical properties. These nanotubes can be constructed from combinations of carbon, boron, nitrogen and other elements. It is a further object of the invention to design carbon nanotubes in which the nanotube index is different on either side of a junction point in the tube so that the electrical properties on either side of the junction vary in a useful fashion. For example, a carbon nanotube may be electrically conducting on one side of a junction and semiconducting on the other side. An example of a semiconductor-metal junction is a Schottky barrier. Alternatively, the carbon nanotube may exhibit different semiconductor properties on either side of the junction. A junction that joins materials having different semiconducting properties on either side of the junction is sometimes referred to as a heterojunction. Nanotubes containing heterojunctions, Schottky barriers, and metal-metal junctions are useful for microcircuitry.

The present invention comprises a new nanoscale metal-semiconductor, semiconductor-semiconductor, or metal-metal junction, made by introducing topological defects in the essentially hexagonal carbon atom structure of a carbon nanotube. The defects change the carbon lattice arrangement such that the nanotube index on one side of the defect is characteristic of metal properties and the index on the other side of the defect is characteristic of semiconductor properties. A junction is thus formed at the site of the defect. The inventive nanotube comprises carbon bonded in an essentially hexagonal array, wherein the array contains some non-hexagonal carbon rings. The non-hexagonal rings comprise a defect that changes the index and forms a junction point in the nanotube. The point where the index changes, that is the point where the defect exists, forms a junction between carbon nanotubes having different electrical conduction properties. The invention comprises essentially carbon nanotubes having metal-semiconductor junctions, semiconductor-semiconductor junctions, and metal-metal junctions. Similar junction effects can be achieved in nanotubes with local chemical additions, subtractions, or substitutions.

IV. DETAILED DESCRIPTION OF THE INVENTION

The inventive carbon nanotube comprises a junction that forms a boundary between two essentially carbon sections having different electrical properties. The two sections on either side of the junction are characterized by different nanotube indices. The difference in electrical properties of the carbon nanotube sections relates to the size of the band-gap. The band-gap in one section may be so small that the tube in that section is electrically conducting and has metallic characteristics, while the size of the band-gap in the other section is characteristic of a semiconductor. Alternatively, the junction may separate two different semiconductor forms of the carbon nanotube, or two different metallic forms of a carbon nanotube.

Use of the term "band-gap" herein means the energy separating the valence band from the conduction band in a material.

Use of the term "defect" herein means a ring of carbon atoms bonded together, within an essentially carbon lattice, in which there are either more than six or less than six carbon atoms.

Use of the term "hexagon" herein means a six-membered ring of carbon atoms.

Use of the term "pentagon" herein means five-membered ring of carbon atoms.

Use of the term "heptagon" herein means seven-membered ring of carbon atoms.

Use of the term "pentagon-heptagon pair" herein means one seven-membered carbon ring and one five-membered carbon ring.

Use of the term "adjacent pentagon-heptagon pair" herein means one seven-membered carbon ring and one five-membered carbon ring wherein two atoms are members of both a five-membered carbon ring and a seven-membered carbon ring.

Use of the term "extended pentagon-heptagon pair" herein means one seven-membered carbon ring and one five-membered carbon ring wherein no atoms are members of both rings.

Each section of the nanotube is comprised essentially of carbon bonded in an essentially hexagonal lattice. The geometrical arrangement of the lattice, for example the extent to which adjacent hexagons in the lattice form a helix on the surface of the tube, is designated by a nanotube index (n,m). The geometry of the defect free nanotube, as described by the nanotube index, determines the electrical properties of the nanotube. For example, carbon nanotubes having a nanotube index in which n=m, for example, (5,5) or (9,9), are metals. Carbon nanotubes characterized by an index of (n,m) where n−m is a nonzero multiple of three, for example, (6,3) or (12,0), have band-gap less than 0.1 eV and are characteristic of semiconductors or semimetals. Carbon nanotubes having nanotube indices different from those described above, for example, (7,0) or (13,4), are semiconductors having band-gaps up to 1.0 eV and decreasing in proportion to the nanotube radius.

Wherever non-hexagonal carbon rings are introduced into the essentially hexagonal lattice, the nanotube index changes. The non-hexagonal ring is referred to as a "defect" because it forms an irregularity in the essentially hexagonal structure of the carbon lattice. A defect that changes the nanotube index, and concomitantly the electrical properties, without causing the tube to flare or to close, forms a junction. It is termed a junction because the electrical properties are dissimilar on either side of the junction. In addition to forming a metal-semiconductor junction in the carbon nanotube, a semiconductor-semiconductor or metal-metal junction can be formed.

The junction in the inventive nanotube comprises rings that form a pentagon and a heptagon in the otherwise essentially hexagonal carbon lattice. In other words, two carbon nanotubes having different indices, can for the first time, be joined using a nanotube section containing at least one pentagonal and at least one heptagonal carbon ring. There must be one pentagonal carbon ring for each heptagonal ring in the junction. There may be many more than one pentagon-heptagon pair in the junction depending on the size and nanotube index of the nanotube sections to be joined at the junction. The inventive junction comprises the carbon nanotube section that contains the pentagon and hexagon "defect" in the essentially hexagonal lattice.

Varying the position of the carbon pentagon ring with respect to the carbon heptagon ring within the junction varies the nanotube index on either side of the junction. When the pentagon and heptagon are adjacent, but not aligned either with the long axis of the tube or with the circumference of the tube, a nanotube having indices of (n,m) on one side of the junction joins to a nanotube having indices of either (n+1,m−1) or (n−1,m+1) on the other side of the junction. In another example, if the pentagon and heptagon are adjacent and are aligned with the long axis of the tube, a nanotube having a indices of (n,0) on one side of the junction joins, through the pentagon-heptagon-pair-containing junction, to a tube having a nanotube index of either (n+1,0) or (n−1,0).

The inventive junction may comprise a pentagon ring that is not adjacent to the heptagon ring. In this case the nanotube section on one side of the junction has a radius that is different from the radius on the other side of the junction. The difference in radii of the two sections is proportional to the distance between the pentagon ring and the heptagon ring.

A constant diameter tube geometry is retained on both sides of the junction only when the junction comprises at least one pentagon carbon ring and one heptagon carbon ring. The pentagon and heptagon may be adjacent or separated by several hexagons. The pentagon and heptagon may lie in a line parallel to the long axis of the tube, or they may lie in a line that forms an angle with the long axis of the tube. There may be more than one pentagon and one heptagon in the junction. The most stable relative position of a heptagon and pentagon pair is when they are adjacent. A junction comprising a single heptagon defect in the essentially hexagon lattice causes the tube on one side of the junction to taper and close. A junction comprising a single pentagon defect in the essentially hexagon lattice causes the tube to flare and expand.

A junction comprising one or more pentagon-heptagon pairs in a given configuration joins two semi-infinite semi-conducting nanotube sections having different band gaps. This means that overall, the junction neither causes one section of the tube to flare nor to close. Alternatively the junction may be configured to join an electrically conducting section to a semiconducting section. It is further possible to design a junction that joins two conducting nanotube sections.

The inventive semiconductor-semiconductor junction carbon nanotube in which nanotube sections having band-gaps that differ by more than the thermal energy of a free electron are joined together, can be doped with to become a p-n junction.

A low dimension quantum well device can be constructed by joining two large band-gap semiconducting carbon nanotubes to either end of a small band-gap semiconducting nanotube. The difference in band-gap sizes is greater than the thermal energy of a free electron. The resulting nanotube comprises three sections having a small band-gap section surrounded by two large band-gap sections. The small band-gap section acts like a quantum well, and has useful properties in optics and electronics. The inventive carbon semiconductor-semiconductor junction nanotubes are also useful design nanocircuits having a variety of band-gap sizes positioned at specific locations with respect to one-another.

Figure 1:
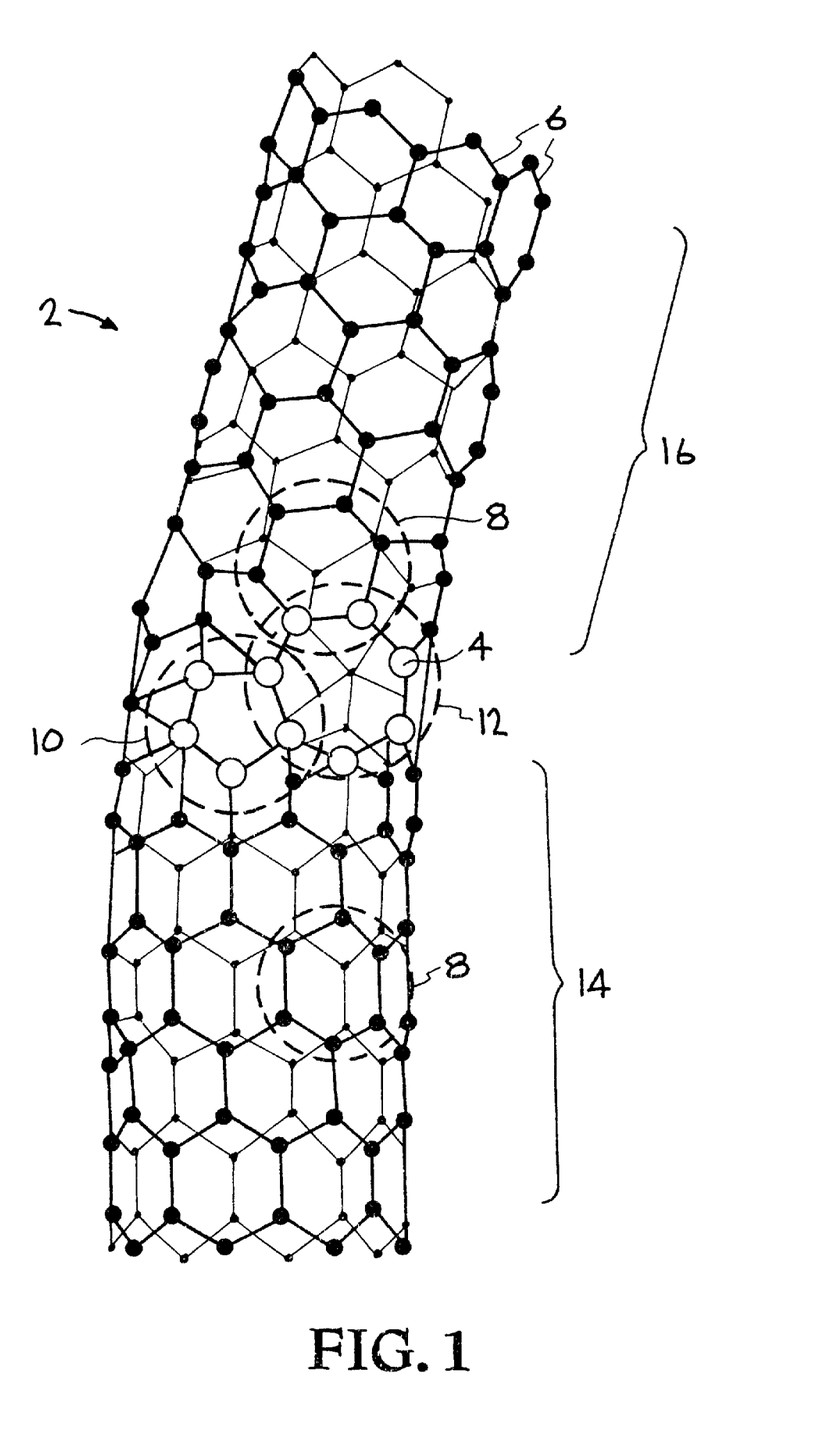
FIG. 1: schematically shows the atomic structure of a carbon nanotube in which a heptagon-pentagon carbon-ring structure has been introduced.

FIG. 1 schematically illustrates an inventive carbon nanotube 2. Each circle, or ball, in the structure represents a carbon atom 4. The lines between the carbon atoms represent carbon-carbon bonds 6. It can be seen that the carbon atoms are essentially arranged in hexagonal rings 8. Two rings in the illustrated nanotube are not hexagonal and they are highlighted by use of open circles. One forms a pentagon 10 and the other forms an adjacent heptagon 12. This inventive nanotube was created by introducing a pentagon-heptagon carbon ring-pair into the hexagonal carbon ring structure. The pentagon-heptagon ring-pair was discovered to be the smallest topological defect that could be introduced into the hexagonal structure while maintaining minimal local curvature and no net curvature. At the same time, the introduction of this pentagon-heptagon ring-pair causes the helicity and the nanotube index, and thus the electrical properties, of the carbon nanotube to change.

The lower portion of the nanotube 14 shown in FIG. 1 has a nanotube index of (8,0). Since 8-0 is not an integral multiple of 3, nor is n=m, this portion of the tube is a semiconductor having a band-gap of up to 1 eV. The upper section of the illustrated nanotube 16 has a nanotube index of (7,1). In this case 7−1=6, which is an integral multiple of 3, and section 16 of the nanotube has metallic conductivity (i.e. the band gap is so small it behaves as a metal). The junction comprises a pentagon-heptagon pair 10, and 12, at the junction point. Thus, the nanotube illustrated in FIG. 1 is a nanoscale electronic element that can be used to make devices like Schottky barriers, quantum wells, and transistors.

For semiconductor nanotubes, wherein the nanotube index is not (n,n) and n−m is not equal to 3 times an integer, the band-gap is inversely proportional to the diameter of the nanotube. The diameter of the nanotube is limited on the small side by the bond energy of the carbon lattice. As the nanotube diameter decreases, the degree of curvature in the nanotube wall increases and the carbon bond energy begins to influence the band-gap. The lattice energy limits the usefulness of the nanotube as a semiconductor when the nanotube diameter is less than or equal to about 0.5 nm. It is an important factor when the diameter is between about 0.5 nm and about 0.7 nm. For nanotube diameters between about 0.7 nm and about 1.0 nm, the lattice energy resulting from curvature modifies the inverse relationship between nanotube diameter and semiconductor band-gap size, but not significantly enough to limit the utility of nanotubes having diameters in that size range.

For semiconductor nanotubes, wherein the nanotube index is not (n,n) and n−m is not equal to 3 times an integer, the usefulness of the nanotube is limited on the large side by the decreasing band-gap size. At room temperature, a nanotube having a 40 nm diameter has a band-gap of about 0.02 eV. Since room temperature electrons have an energy of 0.02 eV, they jump easily from the valence band to the conduction band and the nanotube does not act as a semiconductor at room temperature. At lower temperatures, where the electron thermal energy is less, a nanotube of 40 nm diameter may satisfactorily behave as a semiconductor.

It can be seen that there are at least three ways to design an electrically conducting, metallic, carbon nanotube section: 1) design the tube diameter large enough that the band-gap decreases to the electron thermal energy; 2) design the tube such that it has a nanotube index where n=m; or 3) design the tube to have indices where n−m=3 times an integer and wherein the band-gap is smaller than the thermal energy of a free electron.

The number of pentagon-heptagon pairs used in the junction and their alignment with the axis of the nanotube, determines the nanotube index and the diameter of the nanotube section on either side of the junction. These parameters, in turn, determine the semiconductor properties each section of the nanotube has.

In general carbon nanotubes having indices in which neither n nor m are zero can be connected to tubes having indices of either (n−1,m+1) or (n+1,m−1) through a junction having a single adjacent pentagon-heptagon pair. A junction having two pentagon-heptagon pairs oriented in the same direction joins a carbon nanotube section having non-zero indices, (n,m), to a carbon nanotube section having (n−2, m+2) or (n+2,m−2). The pattern continues for 3 or more pentagon-heptagon carbon-ring pairs. If p is the number of axially aligned pentagon-heptagon pairs in the junction, it connects a carbon nanotube section (n,m) on one side to a carbon nanotube (n−p,m+p) or (n+p,m−p) on the other side. It will be clear to one of ordinary skill in the art that junctions containing different numbers of pentagon-heptagon pairs connect metal-like and semiconductor-like carbon nanotubes in many different permutations.

An arrangement of two pentagon-heptagon pairs oriented in opposite directions does not change the indices of the tube (i.e. (n,m) goes to (n+1−1,m+1−1)=(n,m)). However, this arrangement changes the local electrical properties of the tube. The region of the tube within 1 nanometer of any pentagon or heptagon comprising the two oppositely-oriented pentagon-heptagon pairs has increased metallic character. The effect of introducing an oppositely-oriented pair of pentagon-heptagon defects in a semiconductor tube is to reduce its band gap. The effect of introducing an oppositely-oriented pair of pentagon-heptagon defects in a metallic tube is generally to increase the density of states.

A carbon nanotube having one index equal to zero, (n,0), is joined to a (n+1,0) or to a (n−1,0) through a junction having one adjacent pentagon-heptagon pair aligned parallel to the axis of the (n,0) tube. If the heptagon is on the side of the (n,0) section, it joins that section to a (n+1,0) nanotube; if the pentagon is on the side of the (n,0) section, it joins that section to a (n−1,0) nanotube.

It is not necessary for the pentagon and heptagon to be adjacent in the junction; instead an extended pentagon-heptagon pair can be used in the junction. When the pentagon and heptagon are separated by essentially hexagonal carbon rings, the nanotube index of the nanotube sections joined on either side of the inventive junction can vary by any amount depending on the number of intervening hexagons. For example, if only one hexagon separates the pentagon and the heptagon, then the junction connects an (n,0) nanotube with a (n+2,0) or an (n−2,0) nanotube. The general rule is, a nanotube having a (n,0) index is joined to a nanotube having a (n+p+1,0) or (n−p−1,0) where p is the number of hexagons intervening between the pentagon and the heptagon. When the heptagon is oriented to the (n,0) side, the joined tube has nanotube index (n+p+1,0); when the pentagon is oriented to the (n,0) side, the joined tube has nanotube index (n−p−1,0).

An extended pentagon-heptagon pair is also used to form a junction that joins a carbon nanotube having an index (n,m) where neither n or m is zero, to a carbon nanotube having an index of either (n+1+p,m−1+p) or (n−1+p,m+1+p) or (n+1−p,m−1−p) or (n−1−p,m+1−p). The sign of the number, ±1, is determined by the angle the extended pentagon-heptagon pair makes with respect to the (n,m) tube axis. The sign of the term, ±p, is determined by the orientation of the extended pentagon-heptagon pair with respect to the (n,m) side. The greater the extension of the junction, i.e. the greater the distance between non-adjacent pentagon-heptagon pairs, the greater the difference is in the diameters of the joined tubes. However, because the bond energy increases proportionally to the distance between non-adjacent pentagon-heptagon pairs, nanotubes having junctions containing extended pentagon-heptagon pairs are less stable than junctions made with adjacent pentagon-heptagon pairs.

One configuration of the inventive junction results in a junction between two electrically conducting carbon nanotubes wherein current does not transfer across the junction. This occurs when the wavefunction for the electrons have different symmetries on either side of the junction. This condition is obtained when the pentagon-heptagon pairs in the junction are arranged in a symmetrical geometry.

The inventive carbon nanotubes can be doped with other atoms, for example boron (B) or nitrogen (N), to add p or n type carriers. The carriers are attracted to the parts of the device having the smaller band gaps. Doping further enhances the utility and flexibility of the inventive nanotubes. This geometry allows the fabrication of rectifying or gated electronic and optical devices.

A junction marks a transition in electrical properties along the axis of a tube. It is possible to design junctions that match tubes having different electrical properties without using pentagon-heptagon pairs. For example, junctions can be designed in which the transition in electrical properties occurs due to differences in chemical composition. Yet another way to join nanotubes having different electrical properties is to join tubes having a different concentration of oppositely-oriented pentagon-heptagon pairs on either side of the joining point, or junction point.

For example, a carbon tube with indices (n,m) can be joined to a boron nitride tube with indices (n,m) without introduction of any topological defects. The band-gap on the boron nitride side of the junction is between about 4 and about 5 volts. Since the carbon tube can be either metallic or semiconducting, a junction formed by substituting boron nitride for some of the carbon atoms, creates either a metal-semiconducting junction or a semiconducting-semiconducting junction. Any ratio of boron, carbon, and nitrogen may be used (e.g., $B_xC_yN_z$). The process of making these chemical substitutions is described in Phys. Rev. B Vol. 51 page 11229 (1995).

Changes in chemical composition can also be created by introducing dopant atoms that are in contact with either the inside or the outside of the nanotube walls. These atoms change the electrical properties of the former essentially carbon nanotube, by transferring electrons to or from the tube. For example, alkali atoms such as potassium or rubidium donate electrons to the tube when they are in contact with the nanotube walls. Variations in the concentration of such atoms along the axis of a tube creates a transition in electrical properties.

EXAMPLE 1

TEM of Junction Nanotube

Figure 2:
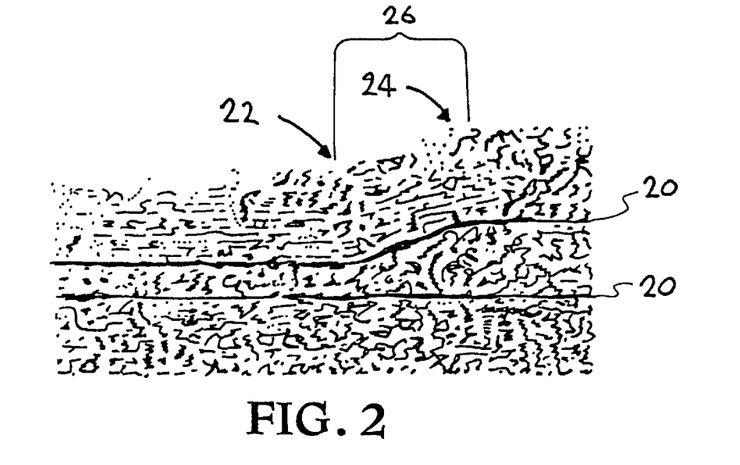
FIG. 2: shows a transmission electron micrograph of a carbon nanotube with an extended pentagon-heptagon defect.
Figure 3A:
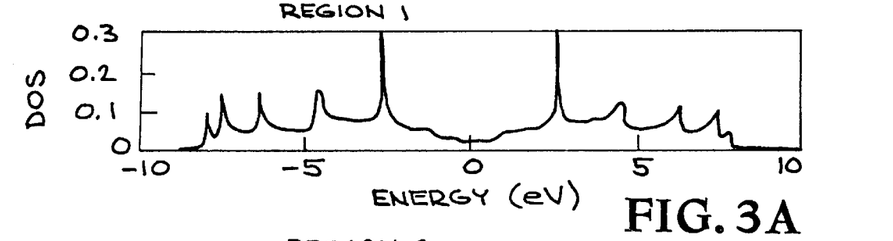
FIG. 3: shows the Density of States (DOS) verses Energy for the semiconducting section of a nanotube having nanotube index (8,0), and adjoining a (7,1) section.
Figure 3B:
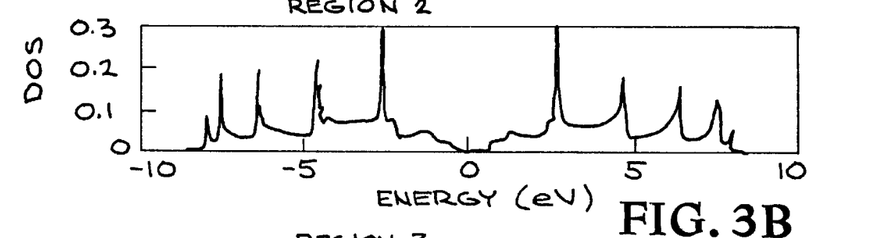
Figure 3C:
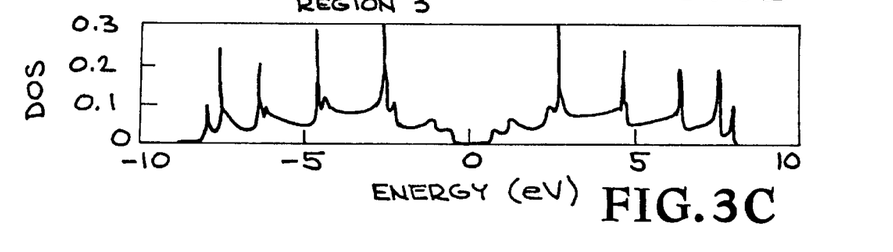
Figure 3D:
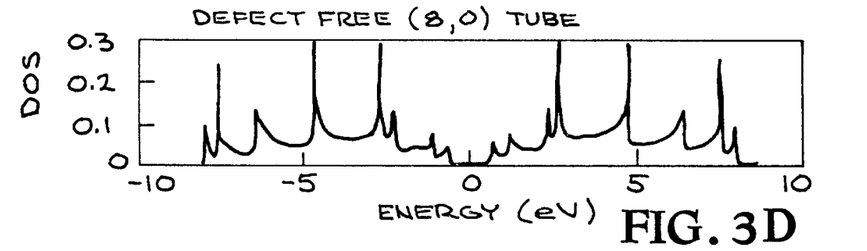
Figure 4A:
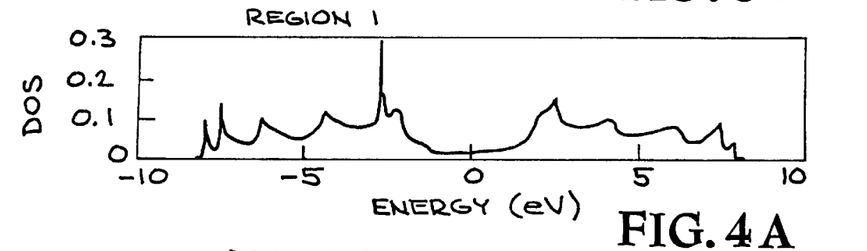
FIG. 4: shows the Density of States verses Energy for the conducting, metallic, section of a nanotube having nanotube index (7,1), and adjoining a (8,0) section.
Figure 4B:
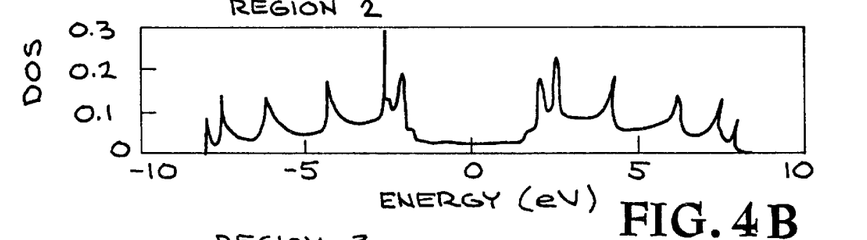
Figure 4C:
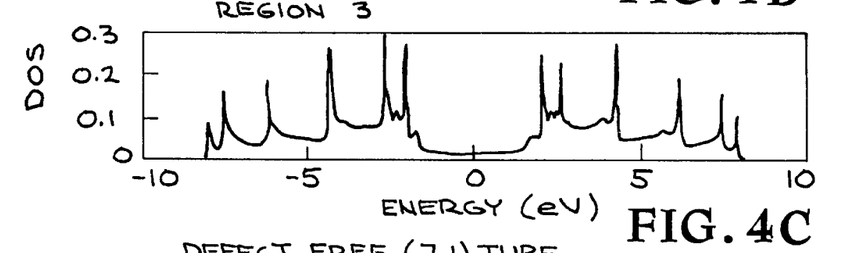
Figure 4D:
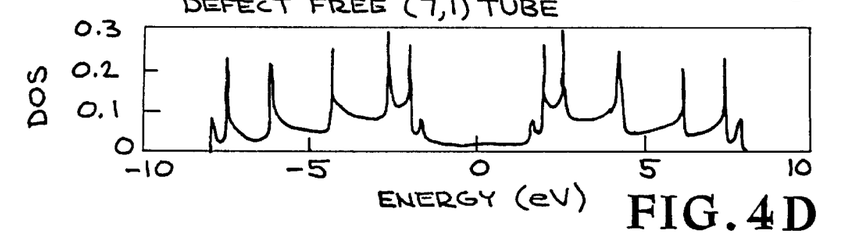
Figure 5A:
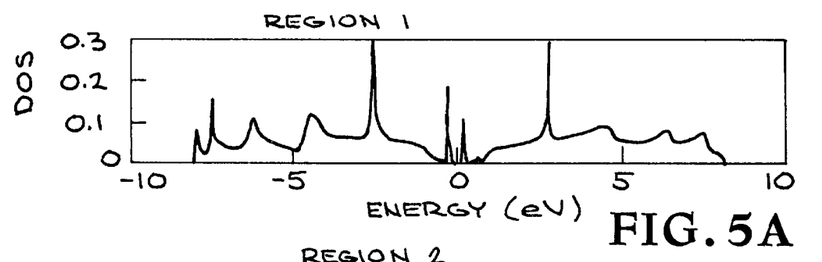
FIG. 5: shows the Density of States verses Energy for the semiconducting section of a nanotube having nanotube index (8,0), and adjoining a (5,3) section.
Figure 5B:
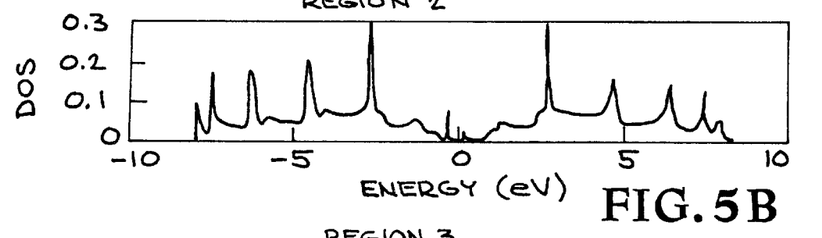
Figure 5C:
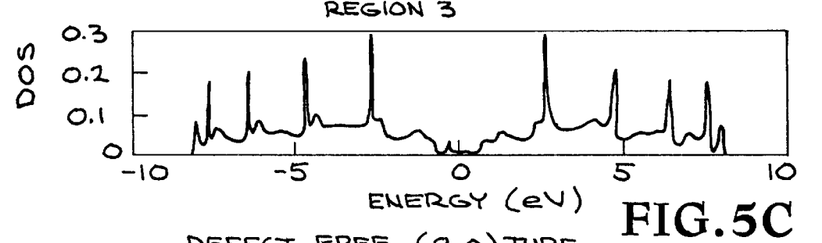
Figure 5D:
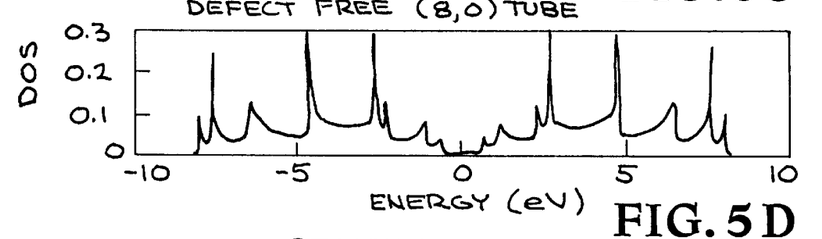
Figure 6A:
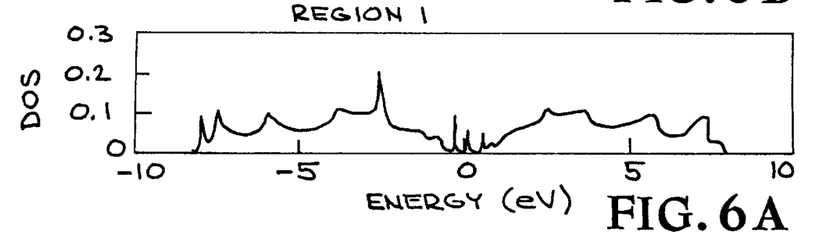
FIG. 6: shows the Density of States verses Energy for the semiconducting section of a nanotube having nanotube index (5,3), and adjoining a (8,0) section.
Figure 6B:
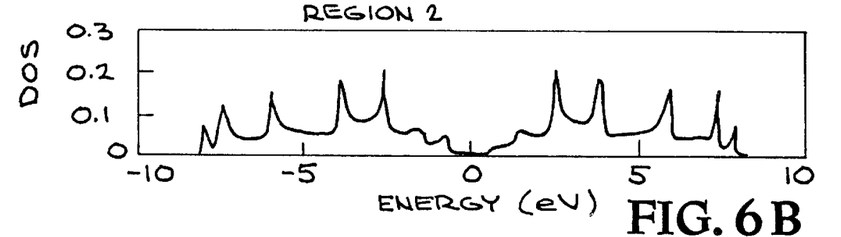
Figure 6C:
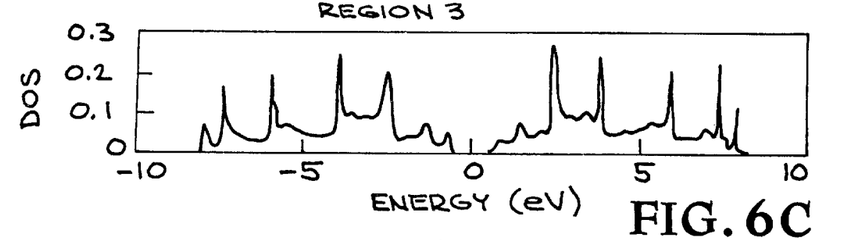
Figure 6D:
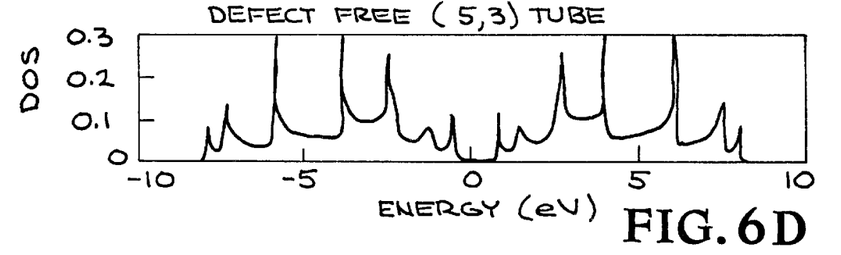

FIG. 2 shows a transmission electron microscope photograph of the inventive carbon nanotube having an extended pentagon-heptagon pair in the junction. The interior wall of the tube 20 is darkened for photographic clarity. The positions of a heptagon 22 and pentagon 24 were inferred by performing geometrical constructions and noting the locations at which tubes with parallel walls join the junction 26. This carbon nanotube was synthesized, isolated, and imaged via transmission electron microscopy using conventional experimental methods [S. Iijima, *Nature* 354, pgs. 56–58, (1991)].

Tubes can also be created which have more than one concentric wall. These tubes are known as multiwalled tubes. FIG. 2 shows a multiwalled tube. The parallel strips above the interior wall 20 are cross-sectional cuts of many concentric tubes. Multiwalled tubes can be designed with junctions as described above existing in the individual walls, yielding structures with transitions in overall electrical properties. These junctions can be between two metals, a metal and a semiconductor, or between two semiconductors of different band gaps.

EXAMPLE 2

Semiconductor/metal Junction

FIG. 1 shows an (8,0) carbon nanotube joined to a (7,1) carbon nanotube. The circled atoms 10 and 12 comprise the adjacent pentagon-heptagon pair that forms the junction. The structure can be denoted as (8,0)/(7,1) in analogy with interfaces of bulk materials. By calculating the electronic structure using quantum theory we find that far from the interface the (7,1) section is a semimetal and the (8,0) section is a semiconductor having a moderate band-gap. The two sections and the junction combine to form a quasi one-dimensional semiconductor/metal junction, taking into account that the band-gap is small enough in the (7,1) nanotube section that it approximately behaves like a metal. The inventive structure, un like other semiconductor/metal junctions, is essentially composed of a single chemical element.

A tight quantum-based tight-binding model having one π-orbital per atom along with the Surface Green Function Matching method (SGFM) (F. Garcia-Moliner and V. R. Velasco, Theory of Single and Multiple Interfaces, World Scientific, Singapore, 1992) was used to calculate the local density of states (LDOS) in different regions of two archetypal sections $(n_1,m_1/n_2,m_2)$ joined through an appropriate junction. In particular, a (8,0)/(7,1) semiconductor/semimetal carbon nanotube was examined. The unit cells of the perfect nanotubes were matched at the interface without the addition of extra atoms by using a single pentagon-heptagon pair.

Using the tight-binding π-electron approximation [X. Blase et al., Phys. Rev. Lett. 72:1878 (1994)], the (8,0) section has a 1.2 eV gap and the (7,1) section is a semimetal. Within the tight binding approximations, these tubes form an archetypal semiconductor/metal junction. We found that curvature-induced σ-π hybridization modified these band-gaps. In particular, within the local density approximation (LDA) the gap of the (8,0) section was 0.62 eV and the (7,1) section had a band-gap less than 0.1 eV. Qualitatively the (7,1) section behaved like a metal, when the π-electron tight binding treatment was used, so it was possible to examine this tube as a semiconductor/metal junction.

The local density of states in various regions on both sides of the (8,0)/(7,1) junction. The π-electron tight-binding Hamiltonian is of the form, $$H = -V_{pp\pi} \sum_{ij} a_i^\dagger a_j + c.c.$$

where i and j are restricted to nearest neighbors, and $V_{pp\pi}$=2.66 eV [using the π-π nearest neighbor hopping parameter of X. Blase et al.] The on-site energy is set equal to zero. Within this theory, graphite sheets and defect-free nanotube have complete electron-hole symmetry with their Fermi levels at zero. For simplicity all nearest-neighbor hoppings were assumed to be equal, independent of the length, location and orientation of the bonds on the matched tubes. Deviations in bond lengths due to reconstruction near the interface were neglected. Hence, the changes in local electronic structure were studied solely as a result of changes in the connectivity on the lattice.

To determine the LDOS of two joined semi-infinite nanotubes, the Green function was calculated using the SGFM method. Details concerning this formalism can be found in the Garcia-Moliner reference above. The SGFM technique allowed the Green function of a composite system, formed by joining two semi-infinite media, to be calculated, using the Green functions of the two infinite constituent systems. Thus, knowing the Green functions of the defect-free $(n_1,m_1)$ and $(n_2,m_2)$ nanotubes, the Green function of the nanotube system formed by joining two semi-infinite tubes, $(n_1,m_1/n_2,m_2)$ can be constructed. Knowledge of the Green function allows the local density of states (LDOS) to be extracted at any site on the combined structure. For sections, three regions were defined each successively more distant from the junction. The LDOS of comparably situated region was compared for several nanotube structures.

The results for the (8,0)/(7,1) nanotube structure was plotted as shown in FIGS. 3 and 4. The first three panels of FIG. 3 show regions defined by a unit-cell. The LDOS were averaged for each of three regions in the (8,0) section of the nanotube. The last panel shows the density of states (DOS) of a defect-free (8,0) nanotube. The regions are numbered beginning from the junction, so region 1 of the (8,0) section is in contact with the junction and region 1 of the (7,1) section. The LDOS was averaged over each region because quantum interference effects distort the LDOS on individual atomic sites. The region in the (8,0) nanotube section comprises a circumferential ring of hexagons having 32 atoms. A unit cell in the (7,1) section has 76 atoms, so instead of defining a region as a unit cell in this section, FIG. 4 shows regions in the (7,1) section as carbon rings containing 32-atoms. In this way the local density of states on either side of the junction can be directly compared as a function of distance from the junction.

FIG. 3 shows that the LDOS on the (8,0) semiconducting section is most distorted in region 1, the region nearest the junction. A coincidental alignment of the bands farthest from the Fermi level in the asymptotic regions on either side of the junction suggests that the difference from the defect-free DOS is biggest for energies near the gap for this specific junction. In particular, region 1 shows allowed states in the energy range of the gap of the infinite (8,0) section. These metal-induced gap states (V. Heine, Phys Rev. 138:1689 (1965); S. G. Louie and M. L. Cohen, Phys. Rev. B 13:2461 (1976)] are characteristic of a metal-semiconductor junction. These states disappear rapidly with distance from the junction, as shown in the plots for regions 2 and 3 in FIG. 3. As distance from the junction increases, the defect-free nanotube DOS features appear: in region 3, all the van Hove singularities of the infinite nanotube can be clearly identified.

FIG. 4 shows the LDOS for the (7,1) section averaged over regions containing 32-atoms. This is somewhat fewer atoms than are contained in a unit cell, but the 32 atom range was used so results could be compared to those of the (8,0) section.

The band-gap in the (7,1) carbon nanotube section was so small that it essentially behaved like a metal, that is like a conductor. The LDOS around the Fermi energy (0 eV) in the metallic (7,1) nanotube section was essentially unchanged. The van Hove singularities present in the last panel showing the LDOS for a defect-free (7,1) section are, in the first panel showing region 1, smeared out, with the exception of those at the highest and lowest energies. With increasing distance from the junction, features characteristic of the infinite (7,1) nanotube appear in the (7,1) section of the (8,0)/(7,1) carbon nanotube. In panel 3 of FIG. 4, showing the LDOS for region 3 of the (7,1) section, all the features of the defect-free (7,1) nanotube are identifiable.

EXAMPLE 3

Semiconductor/semiconductor Junction

A (8,0)/(5,3) semiconductor/semiconductor carbon nanotube was examined using the same techniques as above. The heterojunction joining the unit cells of the (8,0) and (5,3)

nanotube sections was formed using three pentagon-heptagon pairs and two hexagons. Two different junction configurations were possible: one having the two hexagons adjacent and one having the hexagons separated. The sequence of n-membered carbon rings encountered when tracing around the circumference of the nanotube heterojunction was: 6, 7, 5, 6, 7, 5, 7, 5.

The band-gap of a defect-free (5,3) nanotube is 1.4 eV 0.2 eV larger than that of the (8,0) nanotube. The (8,0)/(5,3) nanotube thus provides a prototypical example of a semiconductor/semiconductor heterojunction.

The methods used to determine the LDOS was the same as described in Example 2.

The results for the (8,0)/(5,3) semiconductor-semiconductor heterojunction are plotted in FIGS. 5 and 6. For the same reasons of comparison as above, the LDOS for the (5,3) nanotube section was averaged over closed regional containing 32 atoms instead of unit cells. Two defect states appear in the gap near the junction. The geometric distortions due to the three pentagon-heptagon pairs in the junction region create states in the gap in a manner similar to that seen in bulk semiconductor interfaces. The bond distances in the junction were not changed, so the appearance of these new states are attributed to the changes in the lattice connectivity, that is, to the alteration of the network topology. These interface states may pin the Fermi energy of the semiconductor-semiconductor tube.

The interface states have maximal LDOS in region 1 of the (8,0) Their amplitudes are appreciable in 5 consecutive 32-atom rings, circumference regions, a 12 Å distance along the nanotube axis. The amplitudes decay faster with distance from the junction in the (5,3) section. This behavior is expected because (5,3) is the large band-gap semiconductor section. As was observed in the previous example, the LDOS in the junction region is the most distorted; features of the perfect (5,3) and (8,0) nanotubes appear some distance away from the junction region. The prominence of the interface states in this junction was a consequence of the presence of three pentagon-heptagon pairs. Other, junctions, that match semiconductor sections with similar band-gap offsets, can be obtained with only a single pentagon-heptagon pair and a consequently reduced density of interface states. In this example, a configuration was chosen to minimize the difficulty of the calculations.

EXAMPLE 4

Gated Conductive Channel

A nanocircuit electrical switch is formed by joining two metallic carbon-nanotube-sections to either end of a semiconductor carbon-nanotube-section. This nanotube does not conduct a current from end to end. However, applying sufficient negative voltage to the semiconducting section enables the three-section nanotube to conduct current from end to end. In light of the teaching above, one of ordinary skill in the art can configure such a device.

EXAMPLE 5

Conductor-conductor Junction

A junction was designed that connects two carbon nanotube sections wherein each section is electrically conducting, but in which current is not conducted across the junction.

An integral number of electron wavefunction oscillations must fit around the circumference of a nanotube. One could make an analogy to the integral number of oscillations that appear on a vibrating string. The number of oscillations defines the angular symmetry of the electronic wavefunctions. In designing this tube, it is useful to concentrate on the highest energy electrons (those near the Fermi energy) since these are the electrons which determine the electrical properties of the nanotube.

A special form of junction was designed by joining two metallic nanotubes in which the highest energy electronic states in each tube had different angular symmetries. Because the atomic arrangement at the interface between the nanotubes has a compatible symmetry, the highest energy electrons from one side of the nanotube do not propagate into the other tube. In this situation the metal-metal junction does not conduct.

The angular symmetries of the electronic states are determined following the method of N. Hamada et al Physical Review Letters Vol. 68 page 1579 (1992). The angular symmetry of the interface is compatible with zero conduction if the angular symmetry of the interface is also a angular symmetry of the nanotubes on either side.

In summary, a junction between two metallic nanotubes was designed in which the electrons do not conduct a current across the junction because of different symmetries in the electronic states on either side of the junction. A similar situation (in which the electronic states on either side of a junction have different angular symmetries) has been designed for junctions between two semiconductors or a semiconductor and a metal.

An external perturbation that breaks this symmetry condition allows a current to flow across the junction. The amount of current is proportional to the strength of the perturbation. Examples of such perturbations are external stress, illumination by light, or the random atomic motions associated with finite temperature. Because the device is very sensitive to external perturbations which weaken the symmetry condition, the device is useful as a detector of these perturbations.

Figure 7A:
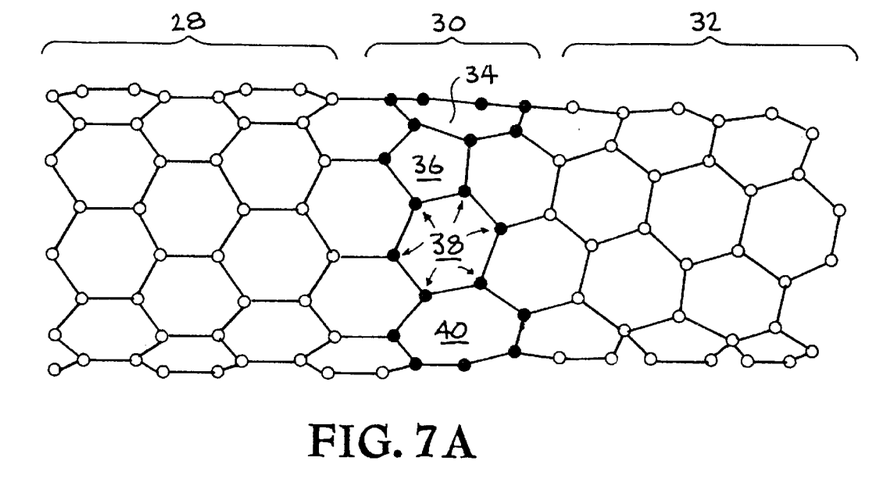
FIG. 7a: shows a side view of the structure of a carbon nanotube having two electrically conducting sections on either side of a junction in the carbon lattice, wherein the electron resonances in each section are different.

This inventive nanotube design is shown in FIG. 7A. Section 28 is electrically conducting wherein the conducting electron has a specific electron resonance, or waveform. Section 32 is electrically conducting wherein the conducting electron has a specific electron resonance, or waveform that is different from that of section 28.

The two conducting sections are joined to a junction 30 that comprises three pentagon-heptagon pairs. Atoms belonging to the pentagon-heptagon pairs are shown as dark, filled circles in the lattice. Each pentagon-heptagon pair has the orientation of the pentagon and heptagon in the same direction, approximately pointing around the circumference of the tube, and each pentagon-heptagon pair is separated by an intervening hexagon. Rings 34, 36, 38, and 40 show respectively, a heptagon ring, a pentagon ring, a hexagon ring (arrows point to the six atoms of the hexagon ring), and a heptagon ring. The next pentagon is not visible because it is wrapping around the underside of the tube.

Figure 7B:
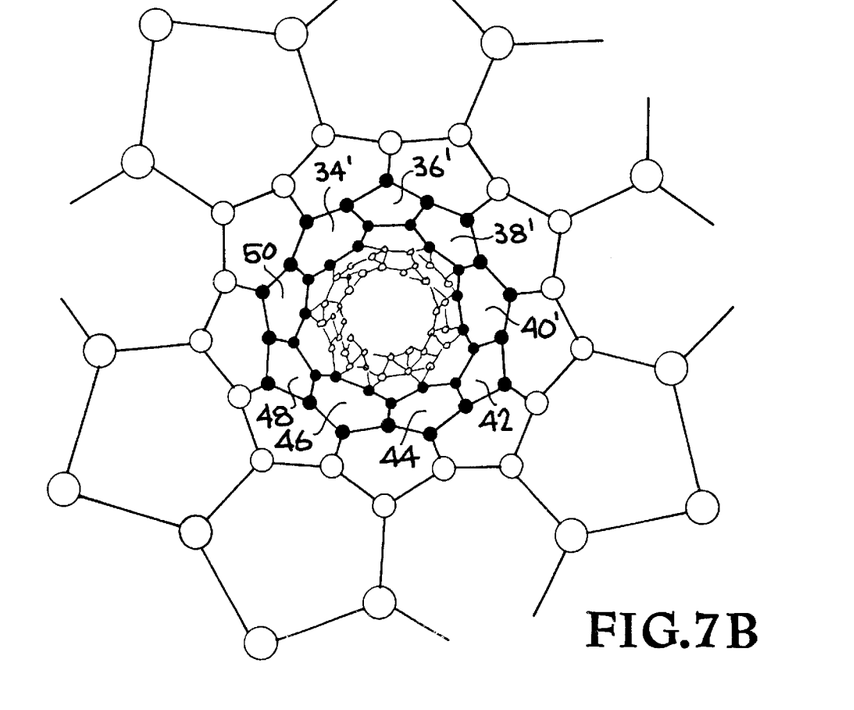
FIG. 7b: shows a view down the long axis of the same tube, looking toward the junction.

FIG. 7B shows a view of the junction from inside the nanotube, looking down its axis. The junction comprising three pentagon-heptagon pairs oriented to approximately encircle the circumference of the tube can clearly be seen. Each pentagon-heptagon pair, 34' and 36', 40' and 42, 46 and 48, is separated from the next pentagon-heptagon pair by a hexagon, 38', 44, 50. Two atoms of each intervening hexagon ring are also members of a heptagon ring in one pentagon-heptagon pair, while two atoms on the opposite side of the intervening hexagon are also members of a pentagon in a different pentagon-heptagon pair. In this figure, rings 34', 36', 38', 40' correspond to similarly numbered rings in FIG. 7A. Section 28 is in the foreground of FIG. 7B and section 32 is pictured beyond the junction.

EXAMPLE 6

A carbon nanotube is designed that incorporates a concentration of oppositely-oriented pentagon-heptagon pairs in its lattice network. If the tube is a semiconductor, the band-gap decreases with increasing concentration of pentagon-heptagon pairs. If the tube is a metal or near-metal, the LDOS increases with increasing concentration of pentagon-heptagon pairs. That is, the metallic character of the tube is enhanced as the concentration of pentagon-heptagon pairs increases.

Figure 8:
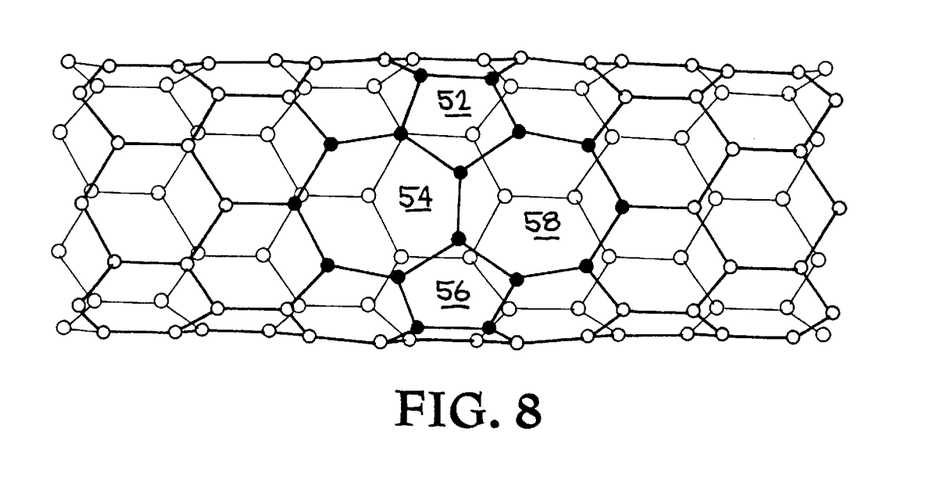
FIG. 8: shows a nanotube having oppositely-oriented pentagon-heptagon pairs.

FIG. 8 illustrates a tube having oppositely-oriented pentagon-heptagon pairs. Atoms that are members of a pentagon-heptagon pair are represented as dark, filled circles in the carbon lattice. The number referring to a ring is located in the center of the ring. Rings 52 and 54 form a pentagon-heptagon pair as do rings 56 and 58. Oppositely-aligned pentagon-heptagon pairs are located in regions along the tube to change the local properties of the tube, for example to make a conducting "pad" or region on the tube. Alternatively, the concentration of pentagon-heptagon pairs within a tube section could be approximately uniformly distributed in the tube section to increase the global conductivity of that section.

Two tubes having different concentrations of pentagon-heptagon pairs can be designed to join into a continuous nanotube having different electrical properties on either side of the joining point. In this case the junction is at the interface between the two tubes rather than a comprising a pentagon-heptagon pair. Instead, the pentagon-heptagon pairs form part of the structure of at least one of the nanotube sections.

Nanotube junctions comprising pentagon-heptagon pairs provide a wide range of device possibilities for doped and undoped nanotubes made of carbon and/or other elements. By arranging the pentagon-heptagon pairs at various points along the length of a carbon nanotube, a series of junctions can be introduced that influence the electronic structure of the tube on either side of each junction. A variety of carbon-based quasi-one-dimensional quantum wells and superlattices with band offsets of about 0.1 eV can be configured using the inventive junctions. In addition, a gated conducting channel can be configured using a suitable voltage source. The Fermi level of a metallic pure carbon nanotube lies within the band-gap of a similar semiconductor nanotube. As such, either n-type or p-type doping of the semiconductor section of a metal/semiconductor interface yields a device similar to a Schottky barrier.

The experimental signature of a pentagon-heptagon pair junction is an abrupt bend between two straight section of nanotube. A tight binding molecular dynamics scheme [C. H. Xu et al. J. Physics-Condensed Matter, 4:6047(1992)] was used on a finite system to calculate the bend angles. For a junction with a single pentagon-heptagon pair, angles of between about 10° and about 15° were obtained. The exact value depended on the particular characteristics of the tubes either side of the junction. An approximately 14° bend was observed in a multiwalled pure carbon nanotube [N. Koprinarov, et al. J. Phys. Chem. 99:2042(1995)].

Thus, the invention provides a new type of metal/semiconductor, semiconductor/semiconductor or metal/metal junction, made essentially of a single element, and based solely on the introduction of one or more pentagon-heptagon pairs in, for example, the essentially hexagonal graphite lattice of carbon nanotubes. Two archetypical junctions have been extensively modeled and one has been fabricated and verified through TEM. These junction provide the elements to manufacture nanoscale semiconductor devices.

The description of illustrative embodiments and best modes of the present invention is not intended to limit the scope of the invention. Various modifications, alternative constructions and equivalents may be employed without departing from the true spirit and scope of the appended claims.

Having thus described the invention, what is claimed is:

1. A carbon nanotube device comprising:
   a first section comprising an essentially hexagonal lattice having a first conductivity type and a set of nanotube molecular indexes, where at least one index is equal to zero;
   a second section comprising an essentially hexagonal lattice having a second conductivity type and a set of nanotube molecular indexes, where at least one index is equal to one;
   a junction region comprising at least one pentagon-heptagon pair, which includes at least one five-membered carbon ring and at least one seven-membered carbon ring, where said junction region has a diameter that is not substantially larger than a diameter of each said section on each side of said junction region and said junction region acts as a p-n junction of said device.

2. The carbon nanotube junction of claim 1 wherein the pentagon ring and heptagon ring are adjacent.

3. The carbon nanotube of claim 1 comprising,
   a) a first electrically conducting section of nanotube; and
   b) a second semiconducting section of nanotube joined to the first section;
      wherein each section is joined to one side of a junction having at least one pentagon-heptagon pair.

4. The nanotube of claim 3 wherein the semiconducting section comprises electron-donating dopant atoms.

5. The nanotube of claim 3 wherein the electrically-conducting section comprises electron-donating dopant atoms.

6. The nanotube of claim 3 wherein both the semiconducting section and the electrically-conducting section comprise electron-donating dopant atoms.

7. The nanotube of claim 3 wherein the semiconducting section comprises electron-accepting dopant atoms.

8. The nanotube of claim 3 wherein the electrically-conducting section comprises electron-accepting dopant atoms.

9. The nanotube of claim 3 wherein both the semiconducting section and the electrically-conducting section comprise electron-accepting dopant atoms.

* * * * *